(12) United States Patent
Bailey

(10) Patent No.: US 7,908,786 B2
(45) Date of Patent: Mar. 22, 2011

(54) ROD HOLDER

(76) Inventor: Steven Bailey, Washington, MO (US)

(*) Notice: Subject to any disclaimer, the term of this patent is extended or adjusted under 35 U.S.C. 154(b) by 141 days.

(21) Appl. No.: 12/013,168

(22) Filed: Jan. 11, 2008

(65) Prior Publication Data

US 2008/0168698 A1    Jul. 17, 2008

Related U.S. Application Data

(60) Provisional application No. 60/879,955, filed on Jan. 11, 2007.

(51) Int. Cl.
*A01K 97/11*        (2006.01)
*A01K 97/12*        (2006.01)
*A01K 97/10*        (2006.01)

(52) U.S. Cl. ...... 43/16; 43/17; 43/21.2; 43/15; 248/518; 248/534; 248/538

(58) Field of Classification Search ............... 43/15–17, 43/21.2; 248/517, 518, 534–536, 538, 540, 248/541

See application file for complete search history.

(56) References Cited

U.S. PATENT DOCUMENTS

| | | | | |
|---|---|---|---|---|
| 1,352,663 A | * | 9/1920 | Hafner | 248/533 |
| 2,033,007 A | * | 3/1936 | Raithel | 248/538 |
| 2,238,127 A | * | 4/1941 | Nissen | 43/21.2 |
| 2,249,302 A | * | 7/1941 | Smith | 43/21.2 |
| 2,360,402 A | * | 10/1944 | Determan | 43/21.2 |
| 2,427,600 A | * | 9/1947 | Hanke | 248/538 |
| 2,448,752 A | * | 9/1948 | Wagner | 248/538 |
| 2,473,778 A | * | 6/1949 | Benes | 43/21.2 |
| 2,548,328 A | * | 4/1951 | Thayer | 43/21.2 |
| 2,657,492 A | * | 11/1953 | Skorr | 43/21.2 |
| 2,689,426 A | * | 9/1954 | Baenen | 43/15 |
| 2,704,411 A | * | 3/1955 | Carroll | 43/17 |
| 2,704,412 A | * | 3/1955 | Davis | 43/21.2 |
| 2,720,048 A | * | 10/1955 | Bracey et al. | 43/17 |
| 2,724,569 A | * | 11/1955 | Licata | 43/21.2 |
| 2,745,088 A | * | 5/1956 | Bauer | 43/17 |
| 2,783,575 A | * | 3/1957 | Housel, Sr. | 43/16 |

(Continued)

FOREIGN PATENT DOCUMENTS

DE        3615775 A1 * 11/1987

(Continued)

*Primary Examiner* — Darren W Ark
(74) *Attorney, Agent, or Firm* — Polster Lieder Woodruff & Lucchesi, L.C.

(57) ABSTRACT

A fishing rod holder that is mountable to a surface. The rod holder comprises an elongated sleeve defining a proximal end, a distal end and a body disposed between the proximal end and the distal end. The body delimits an internal channel that extends between the proximal end and the distal end and that opens out of the distal end. The distal end includes a first cut-out and a second cut-out which are in communication with the internal channel and in communication with each other. The second cut-out is positioned perpendicular with respect to the first cut-out and opening out of the distal end wherein the second cutout is sized and shaped to guide the handle of the fishing rod to the first cut-out as the fishing rod enters the distal end and into the internal channel. The first cut-out is sized and shaped to accept the handle as the handle rotates from the second cut-out and into the first cut-out such that the first cut-out contacts the handle when a fish strikes the fishing line to prevent the rod from exiting the internal channel under force of the fish strike.

8 Claims, 5 Drawing Sheets

U.S. PATENT DOCUMENTS

| | | | | |
|---|---|---|---|---|
| 2,821,041 A * | 1/1958 | Hughes | | 43/16 |
| 2,861,761 A * | 11/1958 | Nordell | | 248/517 |
| 2,908,099 A * | 10/1959 | Burke | | 43/16 |
| 2,909,860 A * | 10/1959 | Braun | | 43/17 |
| 2,948,076 A * | 8/1960 | Patricello | | 43/17 |
| 2,971,734 A * | 2/1961 | Grimes | | 248/533 |
| 2,995,855 A * | 8/1961 | Bell | | 43/21.2 |
| 3,001,314 A * | 9/1961 | Nahrstedt | | 43/15 |
| 3,074,674 A * | 1/1963 | Hill | | 248/538 |
| 3,250,036 A * | 5/1966 | Wenger | | 43/17 |
| 3,285,360 A * | 11/1966 | Wetsch | | 43/17 |
| 3,359,672 A * | 12/1967 | Schwartz et al. | | 43/17 |
| 3,645,028 A * | 2/1972 | Rayburn | | 43/17 |
| 3,646,697 A * | 3/1972 | Jennings | | 43/17 |
| 3,699,701 A * | 10/1972 | Jacobs | | 43/21.2 |
| 3,713,131 A * | 1/1973 | Marshall | | 43/17 |
| 3,729,849 A * | 5/1973 | Richard | | 43/17 |
| 3,777,389 A * | 12/1973 | DeMino | | 43/15 |
| 3,798,630 A * | 3/1974 | Crosthwait | | 43/17 |
| 3,832,794 A * | 9/1974 | Encinias | | 43/15 |
| 3,837,109 A * | 9/1974 | DeJulio | | 43/15 |
| 3,862,508 A * | 1/1975 | Morgan | | 43/17 |
| 3,874,105 A * | 4/1975 | Andree et al. | | 43/15 |
| 3,881,269 A * | 5/1975 | Timmons | | 43/15 |
| 3,914,894 A * | 10/1975 | Kobza | | 43/15 |
| 3,945,143 A * | 3/1976 | Schmitt, Sr. | | 43/17 |
| 3,959,910 A * | 6/1976 | Montgomery | | 43/17 |
| 3,973,346 A * | 8/1976 | Mason | | 43/15 |
| 3,992,797 A * | 11/1976 | Kazakevich | | 43/17 |
| 3,992,798 A * | 11/1976 | Schmitt, Sr. | | 43/17 |
| 4,004,365 A * | 1/1977 | Manchester | | 43/17 |
| 4,007,902 A * | 2/1977 | Pettee | | 43/21.2 |
| 4,012,861 A * | 3/1977 | Gellatly | | 43/15 |
| 4,026,058 A * | 5/1977 | Harris | | 43/15 |
| 4,031,651 A * | 6/1977 | Titze | | 43/15 |
| 4,077,148 A * | 3/1978 | Carey | | 43/16 |
| 4,092,795 A * | 6/1978 | Bryant | | 43/17 |
| 4,112,607 A * | 9/1978 | Scher | | 43/17 |
| 4,133,130 A * | 1/1979 | Young, Jr. | | 43/17 |
| 4,142,316 A * | 3/1979 | Greer et al. | | 43/17 |
| 4,154,015 A * | 5/1979 | Holland | | 43/17 |
| 4,188,742 A * | 2/1980 | Oulman | | 43/15 |
| 4,197,668 A * | 4/1980 | McKinsey | | 43/15 |
| 4,198,775 A * | 4/1980 | Leisner | | 43/21.2 |
| 4,217,719 A * | 8/1980 | McDonnell | | 43/15 |
| 4,217,720 A * | 8/1980 | Karr | | 43/17 |
| 4,219,955 A * | 9/1980 | Lo Bosco | | 43/15 |
| 4,231,178 A * | 11/1980 | Black | | 43/16 |
| 4,235,035 A * | 11/1980 | Guthrie | | 43/15 |
| 4,391,059 A * | 7/1983 | Cordova et al. | | 43/16 |
| 4,397,113 A * | 8/1983 | Pinson | | 43/15 |
| 4,399,630 A * | 8/1983 | Lawes | | 43/17 |
| 4,455,779 A * | 6/1984 | Cosic | | 43/17 |
| 4,461,113 A * | 7/1984 | Erwin | | 43/17 |
| 4,471,553 A * | 9/1984 | Copeland | | 43/15 |
| 4,476,645 A * | 10/1984 | Paarmann | | 43/16 |
| 4,486,968 A * | 12/1984 | Gould | | 43/15 |
| 4,541,195 A * | 9/1985 | Delaney | | 43/17 |
| 4,550,519 A * | 11/1985 | Simmons et al. | | 43/15 |
| 4,551,939 A * | 11/1985 | Kitchens | | 43/21.2 |
| 4,567,686 A * | 2/1986 | Akom | | 43/17 |
| D283,100 S * | 3/1986 | Porter | | D8/71 |
| 4,586,284 A * | 5/1986 | Westwood, III | | 43/17 |
| 4,641,453 A * | 2/1987 | Roberts, Sr. | | 43/17 |
| 4,650,146 A * | 3/1987 | Duke | | 43/21.2 |
| 4,676,018 A * | 6/1987 | Kimball | | 43/16 |
| 4,677,784 A * | 7/1987 | Butkus | | 43/16 |
| 4,807,384 A * | 2/1989 | Roberts, Sr. | | 43/17 |
| 4,823,493 A * | 4/1989 | Gray | | 43/15 |
| 4,969,285 A * | 11/1990 | Ellsworth et al. | | 43/17 |
| 5,076,001 A | 12/1991 | Coon et al. | | |
| 5,129,174 A * | 7/1992 | Wilson | | 43/17 |
| 5,142,809 A * | 9/1992 | O'Brien et al. | | 43/21.2 |
| 5,184,797 A * | 2/1993 | Hurner | | 43/21.2 |
| 5,185,949 A * | 2/1993 | Patterson | | 43/17 |
| 5,231,785 A * | 8/1993 | Roberts | | 43/21.2 |
| 5,313,734 A * | 5/1994 | Roberts | | 43/21.2 |
| 5,321,903 A * | 6/1994 | Ebener | | 43/17 |
| 5,446,989 A * | 9/1995 | Stange et al. | | 43/21.2 |
| 5,501,028 A * | 3/1996 | Hull et al. | | 43/17 |
| 5,542,205 A * | 8/1996 | Updike | | 43/15 |
| 5,557,876 A * | 9/1996 | Parker | | 43/21.2 |
| 5,560,137 A * | 10/1996 | Herring | | 43/21.2 |
| 5,570,532 A * | 11/1996 | Shaffer et al. | | 43/17 |
| 5,632,427 A * | 5/1997 | Gattuso et al. | | 43/21.2 |
| 5,873,191 A * | 2/1999 | Bova et al. | | 43/15 |
| 5,987,803 A * | 11/1999 | White | | 43/21.2 |
| 6,088,946 A * | 7/2000 | Simmons | | 43/15 |
| 6,101,757 A * | 8/2000 | Draghici | | 43/17 |
| 6,263,608 B1 * | 7/2001 | Ernst | | 43/21.2 |
| 6,293,043 B1 * | 9/2001 | Zwettler | | 43/17 |
| 6,301,820 B1 * | 10/2001 | Rosa | | 43/15 |
| 6,336,287 B1 * | 1/2002 | Lobato | | 43/16 |
| 6,374,533 B1 * | 4/2002 | Gonzales | | 43/17 |
| 6,408,561 B1 * | 6/2002 | Winter | | 43/17 |
| 6,421,948 B1 * | 7/2002 | Craig | | 43/17 |
| D461,522 S | 8/2002 | James et al. | | |
| 6,430,864 B1 * | 8/2002 | Thomure et al. | | 43/15 |
| 6,497,067 B1 * | 12/2002 | King | | 43/21.2 |
| 6,530,170 B1 * | 3/2003 | Sweeney | | 43/21.2 |
| 6,626,409 B1 * | 9/2003 | Thompson | | 43/21.2 |
| 6,646,557 B2 * | 11/2003 | Brake | | 43/17 |
| 6,647,658 B1 * | 11/2003 | Park | | 43/15 |
| 6,681,516 B2 * | 1/2004 | Fayerman et al. | | 43/15 |
| 6,763,630 B1 * | 7/2004 | Jenkins | | 43/17 |
| 6,898,893 B1 * | 5/2005 | Mukdaprakorn | | 43/21.2 |
| 7,047,688 B2 * | 5/2006 | Sandman, Jr. | | 43/21.2 |
| 7,320,196 B2 * | 1/2008 | Diederichs | | 43/21.2 |
| 7,331,138 B1 * | 2/2008 | Wegman | | 43/21.2 |
| 7,377,069 B2 * | 5/2008 | Morris | | 43/15 |
| 7,434,348 B1 * | 10/2008 | Welch | | 43/17 |
| 7,454,861 B1 * | 11/2008 | Keibler | | 43/17 |
| 7,559,171 B2 * | 7/2009 | Bateman | | 43/21.2 |
| 7,568,306 B1 * | 8/2009 | Rice, Sr. | | 43/17 |
| 7,621,066 B1 * | 11/2009 | Mathison | | 43/21.2 |
| 2003/0230024 A1 * | 12/2003 | Roberson | | 43/21.2 |
| 2004/0025404 A1 * | 2/2004 | Thompson | | 43/21.2 |
| 2005/0102881 A1 * | 5/2005 | Legendziewicz | | 43/21.2 |
| 2006/0026891 A1 * | 2/2006 | Witt | | 43/15 |
| 2006/0070290 A1 * | 4/2006 | Toy | | 43/15 |
| 2006/0130387 A1 * | 6/2006 | Shumansky | | 43/17 |
| 2006/0254118 A1 * | 11/2006 | Warecke | | 43/21.2 |
| 2006/0260174 A1 * | 11/2006 | Crowe et al. | | 43/21.2 |
| 2006/0265934 A1 * | 11/2006 | Morris | | 43/21.2 |
| 2007/0169394 A1 * | 7/2007 | Keller | | 43/17 |
| 2007/0271835 A1 * | 11/2007 | Wicinski | | 43/17 |
| 2008/0282597 A1 * | 11/2008 | Gascoingne | | 43/17 |
| 2009/0158635 A1 * | 6/2009 | Hope | | 43/17 |

FOREIGN PATENT DOCUMENTS

| | | | |
|---|---|---|---|
| DE | 19707904 A1 * | 9/1998 | |
| EP | 343713 A1 * | 11/1989 | |
| FR | 2592551 A1 * | 7/1987 | |
| FR | 2723513 A1 * | 2/1996 | |
| FR | 2848069 A1 * | 6/2004 | |
| GB | 2052932 A * | 2/1981 | |
| GB | 2074831 A * | 11/1981 | |
| GB | 2341071 A * | 3/2000 | |
| JP | 02027932 A * | 1/1990 | |
| JP | 2000004746 A * | 1/2000 | |
| WO | WO 03024209 A1 * | 3/2003 | |

* cited by examiner

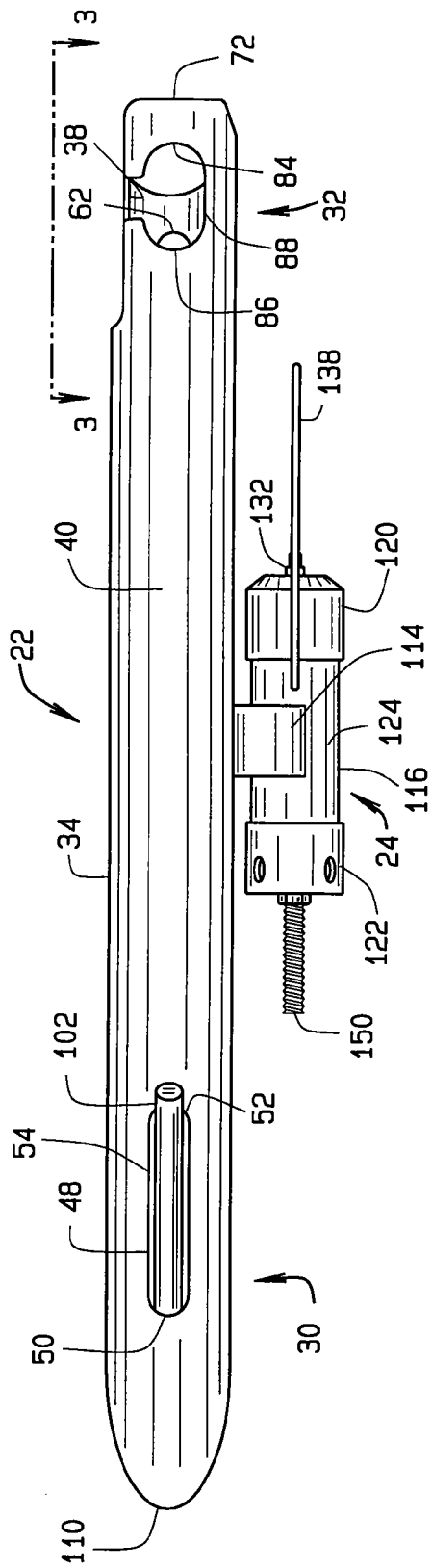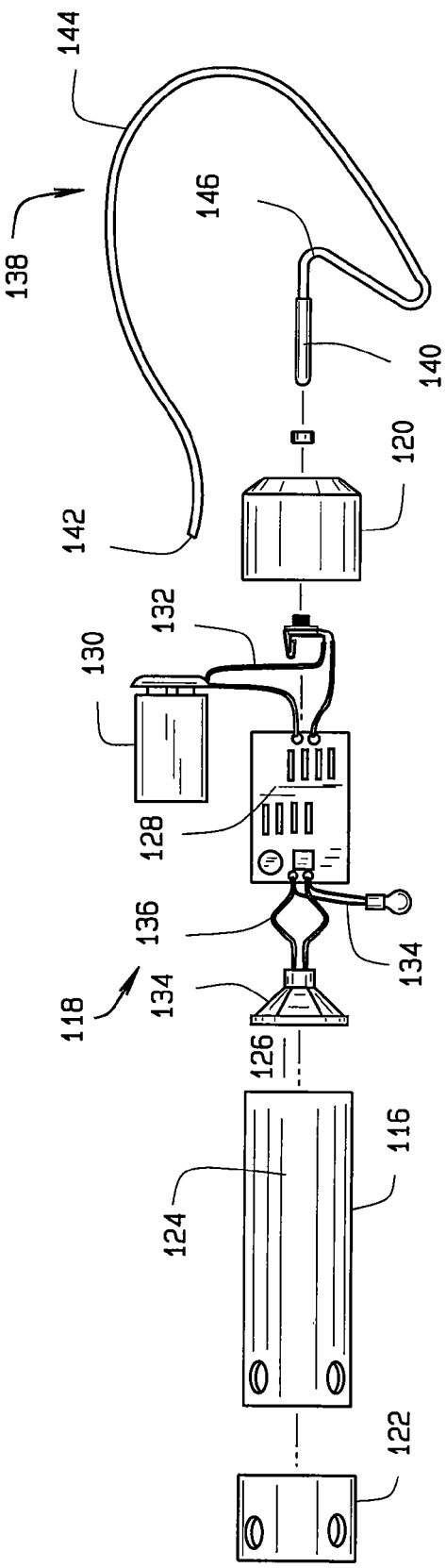

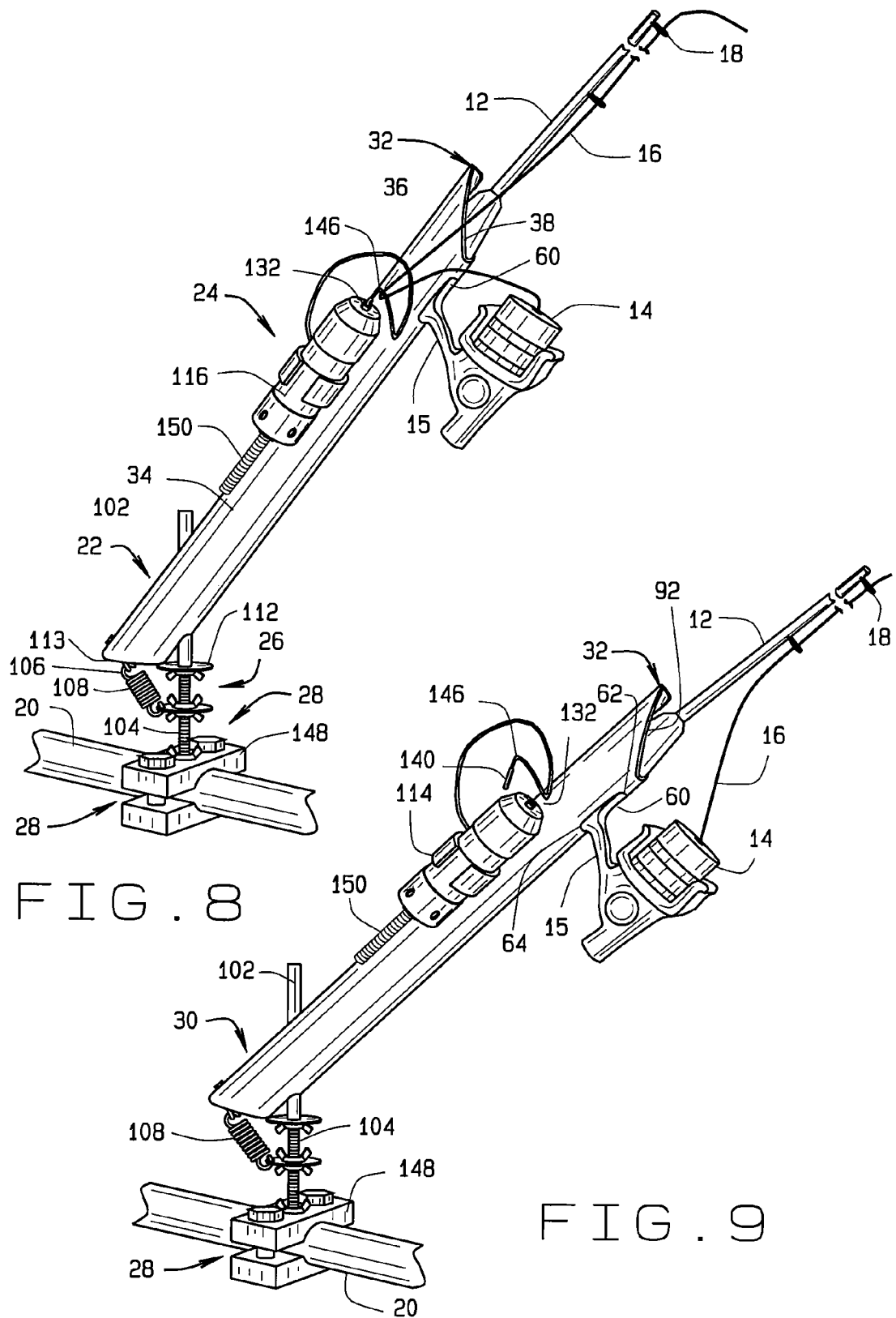

ROD HOLDER

CROSS REFERENCE TO RELATED APPLICATIONS

This application claims priority under 35 U.S.C. §119(e) of U.S. Provisional Patent Application No. 60/879,955 filed Jan. 11, 2007, the application being incorporated herein by reference.

BACKGROUND

The present disclosure relates to a fishing rod holder, and in particular, relates to a rod holder that adjustably tensions a support member to leverage a fishing rod when the fishing rod experiences a fish strike and that emits a signal when the fishing rod experiences the fish strike.

Current rod holders use locking mechanisms to hold the rod in a desired position. Typically, each locking mechanism holds a particular reel of the rod such as an open face reel or a closed face reel. Accordingly, each type of reel requires its own respective locking mechanism leading to redundancy in equipment for the angler. Further, current locking mechanisms use locking components that prohibit convenient mounting and dismounting of the rod. Consequently, the angler has to disengage these components to free the rod for manual handling by the angler leading to missed opportunities for effectively reeling the fish.

Other current rod holders do not conveniently leverage or support the rod once the rod experiences the fish strike. Instead, the support holding the rod typically jumps or jolts when the fish bites the lure/hook leading the rod to move out of the rod holder.

Other current rod holders also use spring-loaded assemblies to hold the rod. The spring-loaded assemblies use a cocked spring that releases upon a strike wherein the release force of the spring assists in setting a lure/hook into the fish's mouth. These assemblies, however, typically release when acted upon by environmental effects such as winds. Additionally, when these current rod holders mount on a boat, the waves and/or movement of the boat tend to release the spring-loaded assembly. These false releases lead to the angler having to repeatedly reset the assemblies. Additionally, the signal portion of these current rod holders activate by the slightest movement of the fish line leading to false alerts for the angler to respond.

BRIEF DESCRIPTION OF THE SEVERAL VIEWS OF THE DRAWINGS

FIG. 2 is top view taken along lines "2-2" of FIG. 1 illustrating the alarm and ends of the rod holder;

FIG. 5 is a break away view of the alarm of FIG. 1 illustrating components of the alarm;

FIG. 8 is a perspective view of a fishing rod and reel supported by one of the cut-outs of the rod holder and operatively connected to the alarm wherein the alarm is in an inactive state; and FIG. 9 is a perspective of the fishing rod and reel of FIG. 7 disconnected from the alarm wherein the alarm is in an active state.

SUMMARY

Figure 3:
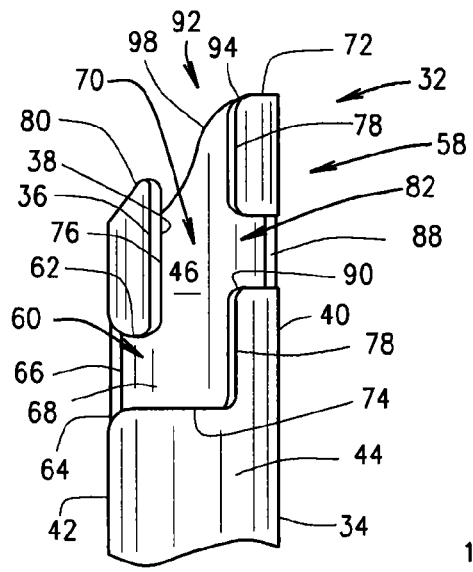
FIG. 3 is a partial side view taken along lines "3-3" of FIG. 2 illustrating cut-outs of one the ends of the rod holder of FIG. 2.

The present disclosure relates to a rod holder that is mountable to a surface such that the mounted rod holder supports a fishing rod, a reel attached to a handle of the fishing rod and a fishing line attached to the reel and suspended by the fishing rod. The rod holder comprises an elongated sleeve, an alarm and a trigger that activates the alarm.

The sleeve defines a proximal end, a distal end and a body disposed between the proximal end and the distal end. The body delimits an internal channel that extends between the proximal end and the distal end and that opens out of the distal end. The distal end includes a first cut-out and a second cut-out which are in communication with the internal channel. The second cut-out is sized and shaped to guide the handle and the first cut-out is sized and shaped to accept the handle of the fishing rod as the fishing rod enters the distal end and into the internal channel.

The alarm connects to the sleeve, wherein the alarm has a housing defining a front end, a rear end and a sidewall disposed between the front end and the rear end. The housing delimits an enclosed chamber between the front end and the rear end and within the sidewall. The alarm includes a control circuit, a power source, a switch and a signal indicator operatively connected to one another.

The trigger operatively connects to the control circuit and the switch. The trigger defines a first end, a second end and a trigger body disposed between the first end and the second end wherein the trigger body is positioned outside of the sidewall of the housing. The first end removably engages with the switch and the second end operatively connects with the control circuit. The trigger body includes a shoulder that contacts the fishing line wherein the fishing line moves the shoulder when the fish strikes the fishing line such that the shoulder movement disengages the first end from the switch to close the control circuit. The control circuit in response activates the signal indicator to issue a signal.

DETAILED DESCRIPTION OF THE DISCLOSURE

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

The present disclosure relates to an alarmed fishing rod holder, wherein the rod holder can be used by any appropriate fishing rod and reel combination. However, for purposes of illustrations only, the rod holder will be described as incorporated into holding an open face reel. Referring to the figures, a rod holder, generally shown as 10 (FIG. 1), of the present disclosure can be of any size to accommodate users and/or fish of any size.

The rod holder 10 is adapted for use with a fishing rod 12 and reel 14 (FIG. 8) while a fishing line 16 attaches to the reel 14 and suspends from the fishing rod 12. In particular, the reel 14 attaches to a handle 15 of the fishing rod 12 and holds a supply of the fishing line 16. The fishing rod 12 includes a series of guides 18 spaced along its length for guiding the fishing line 16 from the reel 14 to a position on the rod end. The fishing line 16 is fed from the reel 14 through guides 18 closest to the reel 14 and then through the remaining guides 18 until it leaves the rod at a last guide 18. The rod holder 10 of the present disclosure is mountable to a variety of surfaces 20 (FIGS. 8 and 9) such as but not limited to the ground or a boat railing.

Figure 1:
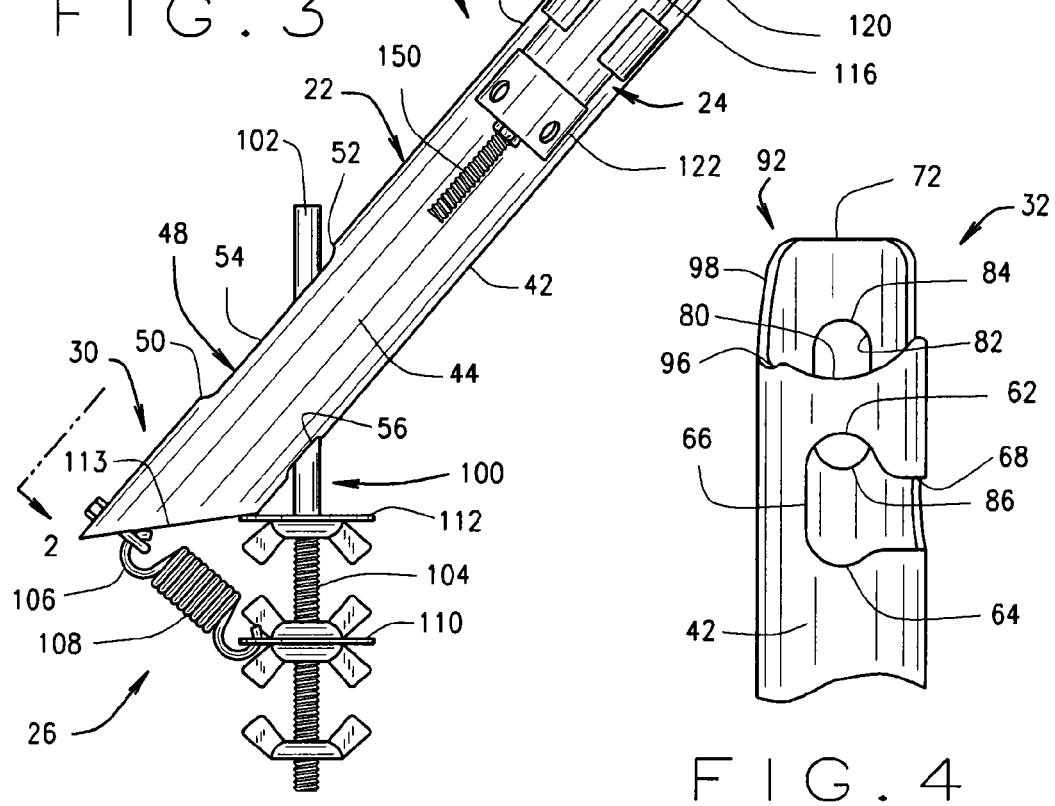
FIG. 1 is a side elevational view of a rod holder, alarm and tension member constructed in accordance with and embodying the present disclosure.

Referring to FIGS. 1 and 2, the rod holder 10 comprises a sleeve generally shown as 22, an alarm generally shown as 24, a tension member generally shown as 26 and a mounting fastener generally shown as 28. The sleeve 22 defines a proximal end 30, a distal end 32 and a body 34 disposed between the proximal end 30 and the distal end 32. The body 34 has a predetermined wall thickness between an outer wall 36 and an inner wall 38. The outer wall 36 has an upper portion 40, a lower portion 42 and side portions 44 along the length of the body 34. The inner wall 38 defines an internal channel 46 which extends between the proximal end 30 and the distal end 32 and opens out of the distal end 32. In one embodiment, the internal channel 46 has a diameter from about 1 and ⅛ inch to about 1 and a ¼ inch. Optimally, the internal channel has a diameter of about 1 and 1/16 inch. In one aspect, the body 34 has a length from about one foot to about two and a half feet. Optimally, the body 34 has a length of about one and a half feet. The dimensions are representative of an embodiment and are not intended to limit the scope of the disclosure. Any size that is easily used for its intended purpose is acceptable.

The sleeve 22 can be made from a variety of materials such as but not limited to polyvinyl chloride, polypropylene, polyethylene, other appropriate thermal plastic materials or metal. Additionally, the sleeve 22 can have a variety of shapes such as elliptical, oval, circular, triangular, square, rectangular, tubular or other appropriate configuration. The material of the sleeve 22 withstands weather elements and wear and tear while the shape of the sleeve 22 provides a device easily handled and transported.

The proximal end 30 includes a slot 48 defined through the upper portion 40 of the body 34. The slot 48 has a first slot end 50 and a second slot end 52 and slot sides 54 extending between the first slot end 50 and the second slot end 52. The slot 48 communicates with the internal channel 46. Optimally, the slot 48 has a length from about two inches to about four inches. The proximal end 30 further includes an aperture 56 defined through the lower portion 42 of the body 34.

Figure 4:
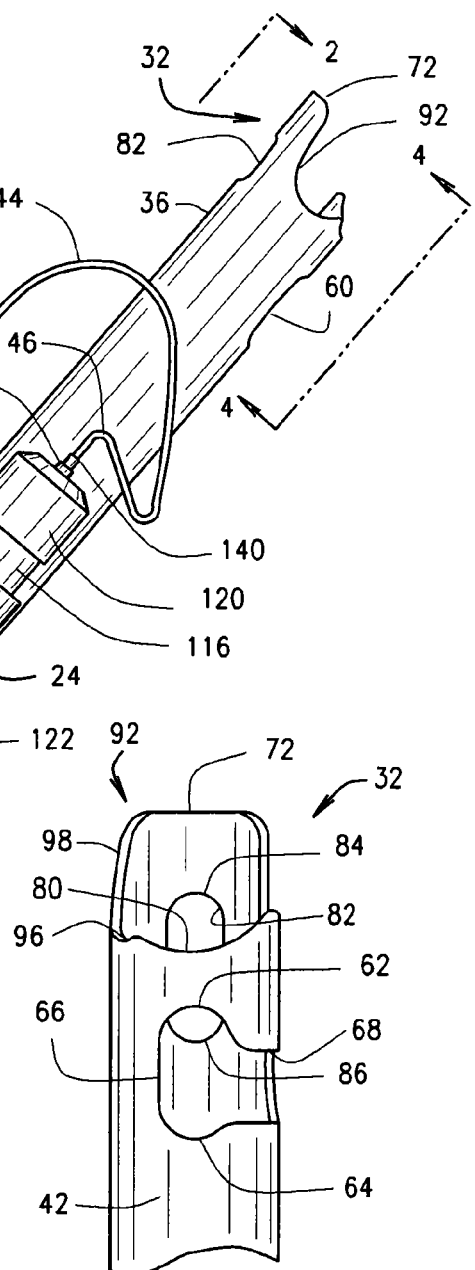
FIG. 4 is a partial bottom view taken along lines "4-4" of FIG. 1 illustrating the cut-outs of FIG. 3 of the rod holder of FIG. 1.

Turning to FIGS. 3 and 4, the distal end 32 includes a cut-out generally shown as 58 in communication with the internal channel 46. As will be discussed, the cut-out 58 is sized and shaped to accept and position a variety of reels 14 and rod handles 15 such as but limited to open faced reels 14, closed faced reels and bait caster reels. A first cut-out 60 is positioned through the lower portion 42 of the body 34 at the distal end 32. The first cut-out 60 includes curvilinear ends 62, 64 and a linear portion 66 positioned between the curvilinear ends 62, 64. The first cut-out 60 further includes an opening 68 positioned opposite the linear portion 66. In one aspect, the first cut-out 60 has a length as measured between the curvilinear ends 62, 64 from about one-half inch to about one and one-half inches and has a width as measured between the linear portion 66 and the opening 68 from about one-quarter inch to about three-quarter inches. Optimally, the first cut-out 60 has a length of about one inch and a width of about a half inch. The dimensions are representative of an embodiment and are not intended to limit the scope of the disclosure. Any size that is easily used for its intended purpose is acceptable.

A second cut-out 70 is positioned through side portion 44 of the body 34. The second cut-out 70 is positioned perpendicular with respect to the first cut-out 60 and is in communication with the opening 68 of the first cut-out 60. The second cut-out 70 opens out of an edge 72 of the distal end 32. The second cut-out 70 includes a curvilinear end 74 in communication with the opening 68 of the first cut-out 60. The second cut-out 70 includes opposing linear portions 76, 78 between curvilinear end 74 and the edge 72 of the distal end 32. As shown, linear portion 76 is shorter than opposing linear portion 78 and includes a beveled edge 80. In one aspect, the second cut-out 70 has a length as measured from curvilinear end 74 to the edge 72 of the distal end 32 from about two inches to about four inches. Further, the second cut-out 70 has a width as measured between opposing linear portions 76, 78 from about one-half inch to about one and a half inches. Optimally, the second cut-out 70 has a length from about three inches and a width of about one inch. The dimensions are representative of an embodiment and are not intended to limit the scope of the disclosure. Any size that is easily used for its intended purpose is acceptable.

A third cut-out 82 is positioned through the upper portion 40 of the sleeve 22 in a perpendicular position with respect to the second cut-out 70. The third cut-out 82 includes curvilinear ends 84, 86 and a linear portion 88 between curvilinear ends 84, 86. The third cut-out 82 also includes an opening 90 that communicates with the second cut-out 70. In one aspect, the third cut-out 82 has a length as measured between curvilinear ends 84, 86 from about a half inch to about one and one-half inches and has a width as measured between linear portion 88 and opening 90 from about one quarter inch to about three quarter inches. Optimally, the third cut-out 82 has a length from about one inch and a width of about one half inch. The dimensions are representative of an embodiment and are not intended to limit the scope of the disclosure. Any size that is easily used for its intended purpose is acceptable.

A fourth cut-out 92 is positioned through side portion 44 of the body 34 opposite the second cut-out 70. The fourth cut-out 92 has an end 94 near the edge 72 of distal end 32 and another end 96 on the lower portion 42 of the sleeve 22. A curvilinear portion 98 is positioned between ends 94, 96.

Returning to FIG. 1, the tension member 26 operatively connects to the proximal end 30 of the sleeve 22. The tension member 26 includes an arm 100 having a head portion 102 and a tail portion 104. The head portion 102 and the tail portion 104 are adjustable with respect to each other. In one aspect, the tail portion 104 adjustably inserts within the head portion 102. Optimally, the head portion 102 has an internal thread which mates with an external thread of the tail portion 104. The head portion 102 is positioned through the aperture 56, the internal channel 46 and the slot 48. The head portion 102 extends beyond the slot 48 and beyond the aperture 56. As shown, the tail portion 104 extends beyond the aperture 56 also.

The tension member 26 further comprises a fastener 106, in the form of a hook, a bias 108 in the form of a spring and adjustable support surfaces 110, 112 in the form of generally flat surfaces such as washers. The tension member 26 provides a counter force to the sleeve 22 when the fish strikes the fishing line 16. The fastener 106 attaches to an inside surface of the proximal end 30 at a position between a beveled edge 113 of the proximal end 30 and the slot 48. The support surfaces 110, 112 adjustably fasten around the tail portion 104. Other fasteners such as hex nuts or wing nuts adjustably fasten the support surfaces 110, 112 to the tail portion 104. As shown, the spring 108 connects to the hook 106 and lower support surface 110. The spring 108 may have a spring constant that correlates to particular test line of the fishing line 16.

The alarm 24 removably connects to the body 34 of the sleeve 22. The alarm 24 operates to produce a signal when the fish strikes the fishing line 16. A connector 114 (FIG. 2) such as a hook and loop fastener connects the alarm 24 to the body 34. Any connecting member that can be employed to attach the alarm 24 to the body 34 is intended to be within scope of the disclosure. In one embodiment, the connector 114 attaches the alarm 24 to the side portion 44 of the body 34. Optimally, the alarm 24 attaches to the side portion 44 that is opposite the first cut-out 60.

Figure 6:
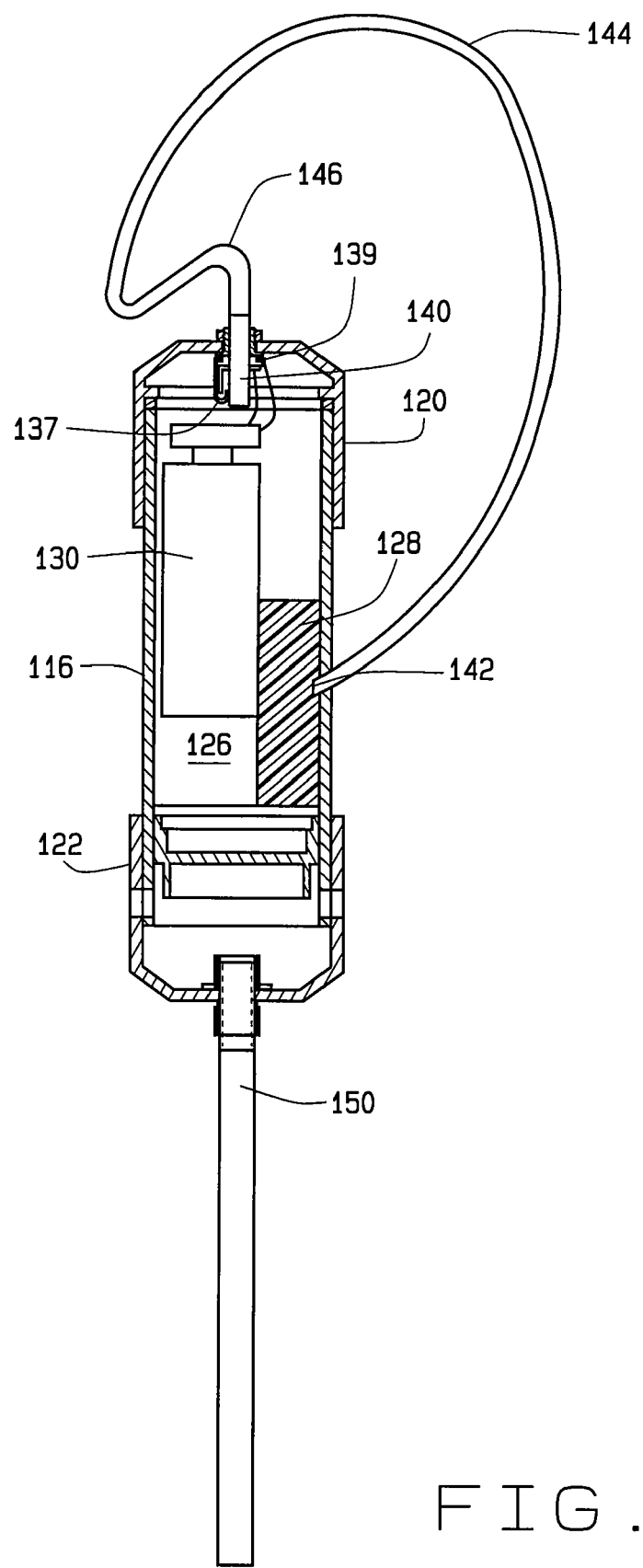
FIG. 6 is a cross sectional view of the alarm of FIG. 5.
Figure 7:
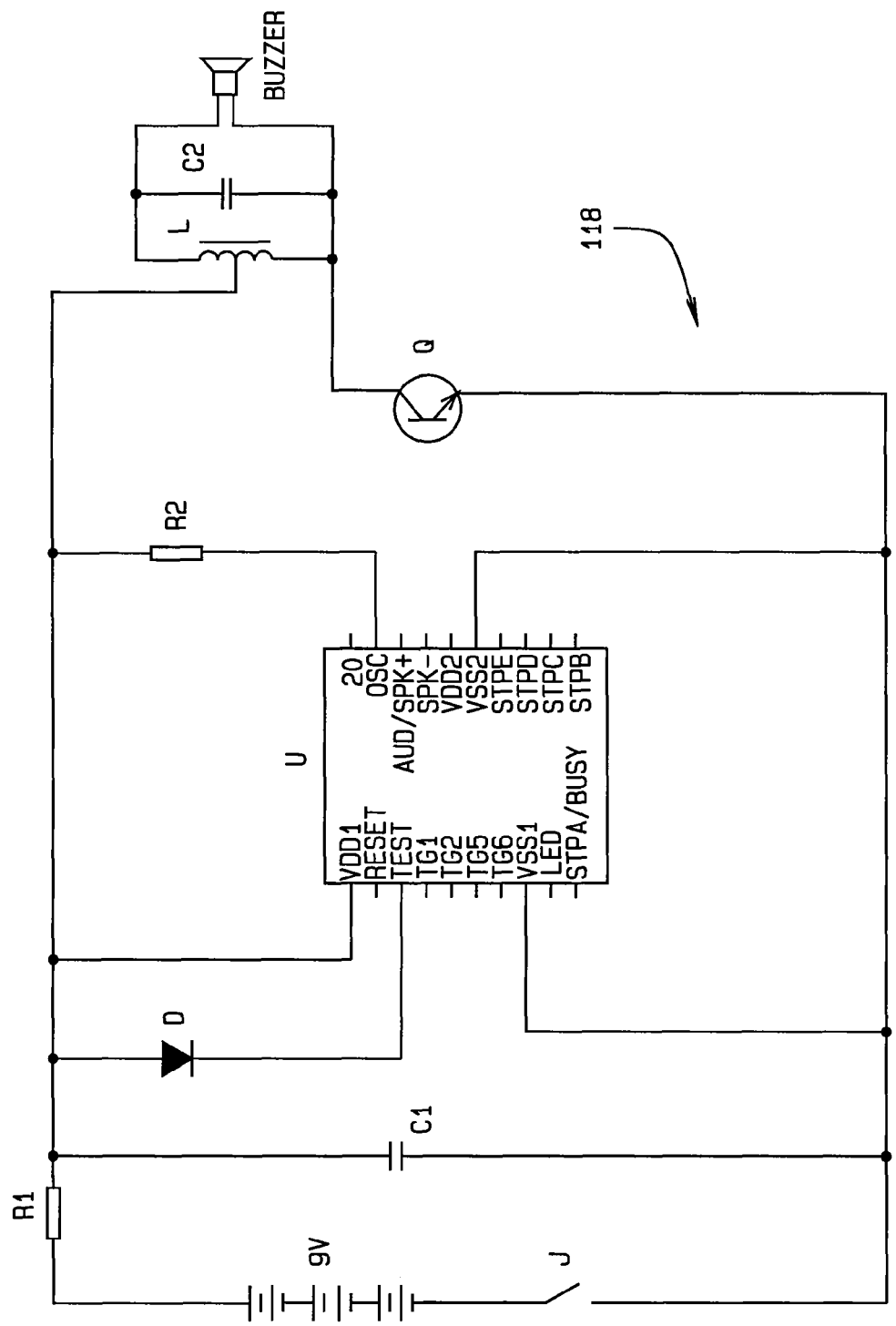
FIG. 7 is an electrical schematic view of the alarm of FIG. 5.

Turning to FIGS. 5-7, the alarm 24 comprises a housing 116 for enclosing circuitry 118 of the alarm 24. The housing 116 includes a front end 120, a rear end 122 and a sidewall 124 disposed between the front end 120 and the rear end 122. Optimally, the front end 120 and rear end 122, in the form of caps, removably connect to the sidewall 124. The housing 116 defines an enclosed chamber 126 between the front end 120 and the rear end 122 and within the sidewall 124. The housing 116 can be made from a variety of materials, such as but not limited to polyvinyl chloride, polypropylene, polyethylene, or other appropriate plastic materials or metal. Further, the housing 116 can have a variety of shapes such as elliptical, oval, circular, triangular, square, rectangular, tubular or other appropriate configurations. In one embodiment, the sidewall 124 comprises an elongated tubular frame. The material of the housing 116 withstands weather elements and wear and tear while the shape of the housing 116 provides a device easily handled and transported.

The alarm circuitry 118 mounts within the enclosed chamber 126. The alarm circuitry 118 includes a control circuit 128, a power source 130 in the form of a battery, a switch 132 and a signal indicator 134 operatively connected to one another by wires 136. The alarm circuitry 118 also comprises a trigger 138 operatively connected to the control circuit 128 and to the switch 132. FIG. 7 illustrates an exemplary schematic of the alarm circuitry 118. In one aspect, the control circuit 128, power source 130 and signal indicator 134 attach to the interior of the housing 116 by fasteners. As shown, the front end 120 of the housing 116 positions the switch 132 to expose the switch 132 to the trigger 138. In one aspect, the switch 132 includes opposing contact plates 137, 139.

The trigger 138 comprises a first end 140, a second end 142 and a trigger body 144 disposed between the first end 140 and the second end 142. The first end 140 of the trigger 138 removably engages with the switch 132 between its contact plates while the second end 142 of the trigger body 144 operatively connects with the control circuit 128. As shown, the trigger body 144 is externally positioned outside of the sidewall 124 of the housing 116. The sidewall 124 of the housing 116 includes a sealed access to allow the second end 142 of the trigger 138 to connect with the control circuit 128. In one aspect, the trigger body 144 comprises a flexible plastic material. The trigger body 144 is bendable to form a shoulder 146 that contacts the fishing line 16 as will be discussed.

The control circuit 128 and switch 132 are in a normally closed position to power the signal indicator 134. In response to the closed position, the signal indicator 134 activates to issue a signal as will be discussed. The first end 140 of the trigger 138 engaging the switch 132, however, opens the switch 132 such that the control circuit 128 is open and the signal indicator 134 does not receive electrical power. In the open position, the signal indicator 134 does not activate and does not issue a signal. The switch 132 cooperates with the movement of the trigger 138 when the trigger 138 opens the switch 132 upon engagement with the switch 132 and when the trigger 138 closes the switch 132 upon disengagement from the switch 132.

In one embodiment, the signal indicator 134 comprises a light source that produces a visual signal when the control circuit 128 is closed by operation of first end 140 of the trigger 138. The light power source may be selected from a group consisting of colored light-emitting diodes. In another embodiment, the signal indicator 134 comprises a vibrator that produces vibratory motion when the control circuit 128 is closed by the operation of the first end 140 of the trigger 138. Optimally, the signal indicator 134 comprises a transmitter that produces an audible signal when the control circuit 128 is closed by operation of the first end 140 of the trigger 138. The issued signal is adjustable by known adjusting means with respect to intensity and/or volume for its vibratory, visual and/or audible effects.

The mounting fastener 28 (FIGS. 8 and 9) removably and adjustably attaches to the tail portion 104 of the arm. The fastener 28 attaches the rod holder 10 to the surface 20 such as a pier, dock or boat railing. In one aspect, fastener 28 comprises a clamp 148 having opposing and adjustable members which are sized and shaped to fasten around the boat railing 20.

During one aspect of operation, the angler positions the head portion 102 through the aperture 56, the internal channel 46 and the slot 48 of the proximal end 30. The angler slides support surface 112 along the tail portion 104 and against the lower beveled edge 113 of the proximal end 30 such that the lower beveled edge 113 contacts support surface 112 (FIGS. 1, 8 and 9). The angler fastens support surface 112 against the head portion 102 at the junction of the head portion 102 and the tail portion 104 and against the lower beveled edge 113 of the proximal end 30. The angler then slides another support surface 110 along the tail portion 104 and fastens the support surfaces 110, 112 along the tail portion 104 by the wing nuts. The angler connects the spring 108 to the hook 106 and to the lower support surface 110. Since the lower support surface 110 is adjustable along the tail portion 104, the angler can adjust the tension in the spring 108 by moving the support surface 110 along the tail portion 104 and away from the head portion 102. As shown, the beveled edge 113 of the proximal end 30 of the sleeve 22 contacts the top of support surface 112 wherein this positioning stabilizes the sleeve 22 and maintains the sleeve 22 in an angled, upright position. The wing nuts are moveable to adjust the tension of the spring 108 to accommodate different forces applied to different types of rods; i.e., lighter rods for lighter fish and heavier rods for larger fish.

The angler then connects the tail portion 104 to the clamp 148 wherein the clamp 148 can be adjustably attached to a variety of surfaces 20 such as the boat rail. Instead of connecting the tail portion 104 to the clamp 148, the angler may insert the tail portion 104 into the ground or insert the tail portion 104 into a receptacle or stanchion positioned on the surface such as the dock or the pier (not shown). Once the angler sets the tail portion 104, the angler can further adjust the tension of the spring 108 and the angle of the sleeve 22 along the arm 100 by adjusting the respective wing nuts.

The angler then removably attaches the alarm 24 to the body 34 of the sleeve 22 to position the front end 120 of the alarm 24 toward the distal end 32 of the body 34 and to position the rear end 122 of the alarm 24 toward the proximal end 30 of the body 34. In this position, the first end 140 of the trigger body 144 engages the switch 132 to maintain the switch 132 in the open position to prevent the control circuit 128 from powering the signal indicator 134. Further, in this position, the shoulder 146 of the trigger body 144 is positioned near the first end 140 of the housing 116.

The angler then handles the fishing rod 12 and the reel 14 to position the fishing rod 12 within the internal channel 46 and to position the fishing rod handle 15 into the appropriate cut-out. In one aspect, for an open face reel 14, the angler rotates the handle 15 and reel 14 to a perpendicular position with respect to the first cut-out 60 and the second cut-out 70. The angler inserts the fishing rod 12 through the distal end 32 and into the internal channel 46. While inserting the fishing rod 12 into the internal channel 46, the opposing linear portions 76, 78 of the second cut-out 70 guides the rotated handle 15 to curvilinear end 74 of the second cut-out 70. When the handle 15 contacts the curvilinear end 74 of the second cut-out 70, the angler rotates the handle 15 into the first cut-out 60 between the curvilinear ends 62, 64 of the first cut-out 60. When the handle 15 rotates into the first cut-out 60, the reel 14 rotates below the first cut-out 60 and below the sleeve 22.

In another aspect of operation (not shown) for a closed-face reel, the angler rotates a finger portion of the closed face reel to a perpendicular position with respect to the first cut-out 60 and the second cut-out 70. The angler inserts the fishing rod 12 through the distal end 32 and into the internal channel 46. While inserting the fishing rod 12 into the internal channel 46, the opposing linear portions 76, 78 of the second cut-out 70 guides the finger portion of the fishing rod 12 to curvilinear end 74 of the second cut-out 70. When the finger portion contacts the curvilinear portion end 74 of the second cut-out 70, the angler rotates the finger portion into the third cut-out 82 between the curvilinear ends 84, 86 of the third cut-out 82. When the finger rotates within the third cut-out 82, the closed-face reel 14 is positioned within the distal end 32 of the sleeve 22. The optimal inner diameter of the internal channel 46 prevents the finger portion from exiting the third cut-out 82 when the fish strikes the fishing line 16.

In yet another aspect of operation (not shown) for a bait-caster reel, the angler inserts the fishing rod 12 through the distal end 32 and into the internal channel 46. While inserting the fishing rod 12 into the internal channel 46, the housing of the bait-caster reel contacts the fourth cut-out 92 wherein the fourth cut-out 92 positions the bait-caster housing within the distal end 32 of the sleeve 22.

Once the angler properly positions the rod holder 10 and appropriate reel 14 within the respective cut-out, the angler places a portion of the fishing line 16 that is suspended by the guides 18 of the fishing rod 12 under the shoulder 146 of the trigger body 144 to contact or engage the fishing line 16 with the shoulder 146. When a fish strikes the fishing line 16 with a predetermined force, the fishing line 16 moves the shoulder 146. The movement of the shoulder 146 pulls out or disengages the first end 140 of the trigger body 144 from the switch 132. The disengagement of the first end 140 closes the switch 132 to operatively connect contact plates 137, 139 of the switch 132. The control circuit 128 senses the closed switch 132 and activates the signal indicator 134 to issue the signal.

The signal indicator 134 in the form of the transmitter emits an audible noise to alert the angler of the fish strike while the signal indicator 134 in the form of the light power source emits a light to alert the angler of the fish strike. Further, the signal indicator 134 in the form of a vibrator emits vibrations to alert the angler of the fish strike. The emitted signal remains continuous until the angler re-engages the first end 140 of the trigger body 144 between the contact plates of the switch 132 to open the switch 132. When the angler uses a plurality of the rod holders 10 of the present disclosure, the different types of emitted signals assist in notifying which rod has been struck by a fish by the audio signal, the visual signal or the vibratory signal.

When the fish strikes the fishing line 16, the sleeve 22 bends towards the water by the force of the fish strike. Since the clamp 148 vertically supports the tail portion 104 and the head portion 102 to the surface 20, the spring 108 produces a counter force on the sleeve 22. The spring counter force assists the tension in the fishing rod 12 which helps keep the fishing line 16 taught when the fish strikes the fishing line 16. The fishing line tension, in turn, keeps the fish on the hook until the angler arrives to handle the fishing rod 12. Due to opposing forces of the fish strike and the spring 108, the sleeve 22 angularly reciprocates between the fish strike forces and the spring forces. The slot 48 allows the sleeve 22 to reciprocate around the head portion 102 of the arm 100. Additionally, the handle 15 moves in response to the fish strike. The curvilinear ends 62, 64 of the first cut-out 60 maintain the handle 15 within the first cut-out 60 to prevent the fishing rod 12 from exiting the internal channel 46.

Still further, in another method of operation (not shown), the angler does not connect the alarm 24 to the rod holder 10 but instead inserts an alarm support 150 (FIGS. 1, 2, 8 and 9) into the surface such as the ground or receptacle. In this mode of operation, the alarm 24 acts as a stand-alone alarm wherein the angler can engage the fishing line 16 with the shoulder 146 of the trigger body 144 as previously discussed.

In view of the above, it will be seen that the several objects of the disclosure are achieved and other advantageous results are obtained. As various changes could be made in the above constructions without departing from the scope of the disclosure, it is intended that all matter contained in the above description or shown in the accompanying drawings shall be interpreted as illustrative and not in a limiting sense.

Moreover, the use of the terms "upper" and "lower" or "top" or "bottom" or "side" or "upwardly" or "downwardly" or "front" or "rear" or "proximal" or "distal" or "head" or "tail" and variations of these terms is made for convenience, but does not require any particular orientation of the components.

The invention claimed is:

1. A rod holder that is mountable to a surface such that the rod holder is configured to support a fishing rod, a reel attached to a handle of the fishing rod and a fishing line which attaches to the reel and suspends from the fishing rod, the rod holder comprising:

an elongated sleeve defining a proximal end, a distal end and a body disposed between the proximal end and the distal end, the body delimiting an internal channel that extends between the proximal end and the distal end and that opens out of the distal end, the proximal end includes a slot defined through the body and includes an aperture defined through the body at a position on the body that is opposite the slot, the distal end includes a first cut-out and a second cut-out which are in communication with the internal channel, the second cut-out being positioned perpendicular with respect to the first cut-out and opening out of the distal end;

a tension member that operatively connects with the proximal end of the sleeve, the tension member includes an arm having a head portion and a tail portion, the head portion being positioned through the aperture, the internal channel and the slot of the proximal end to extend beyond the slot, the tail portion extending beyond the aperture and connecting with the surface; and a spring bias connected to the proximal end and connected to the tail portion such that the aperture is located between the tail portion and the slot, wherein the spring bias in response to a fish strike applies an opposing spring force to the proximal end of the sleeve.

2. A rod holder that is mountable to a surface such that the rod holder is configured to support a fishing rod, a reel attached to a handle of the fishing rod and a fishing line which attaches to the reel and suspends from the fishing rod, the rod holder comprising:

an elongated sleeve defining a proximal end, a distal end and a body disposed between the proximal end and the distal end, the body delimiting an internal channel that extends between the proximal end and the distal end and that opens out of the distal end, the proximal end includes a slot defined through the body and includes an aperture defined through the body at a position on the body that is opposite the slot, the distal end includes a first cut-out and a second cut-out which are in communication with the internal channel, the second cut-out being sized and shaped to guide the handle and the first cut-out being sized and shaped to accept the handle of the fishing rod as the fishing rod enters the distal end and into the internal channel;

a tension member that operatively connects with the proximal end of the sleeve, the tension member includes an arm having a head portion and a tail portion, the head portion being positioned through the aperture, the internal channel and the slot to extend beyond the slot, the tail portion extending beyond the aperture and connecting with the surface when the rod holder is mounted to the surface;

an alarm connectable to the sleeve, the alarm having a housing defining a front end, a rear end and a sidewall disposed between the front end and the rear end, the housing delimiting an enclosed chamber between the front end and the rear end and within the sidewall, the alarm further having circuitry mounted within the enclosed chamber, the circuitry including a control circuit, a power source, a switch and a signal indicator operatively connected to one another; and a trigger operatively connected to the circuitry, the trigger defining a first end, a second end and a trigger body disposed between the first end and the second end wherein the trigger body is positioned outside of the sidewall of the housing, the first end removably engages with the switch and the second end operatively connects with the control circuit, the trigger body includes a shoulder that contacts the fishing line in use wherein the fishing line moves the shoulder when the fish strikes the fishing line such that movement of the shoulder disengages the first end from the switch to close the control circuit such that the control circuit activates the signal indicator to issue a signal.

3. A rod holder that is mountable to a surface such that the rod holder is configured to support a fishing rod, a reel attached to a handle of the fishing rod and a fishing line which attaches to the reel and suspends from the fishing rod, the rod holder comprising:

an elongated sleeve defining a proximal end, a distal end and a body disposed between the proximal end and the distal end, the body delimiting an internal channel that extends between the proximal end and the distal end and that opens out of the distal end, the proximal end includes a slot defined through the body and includes an aperture defined through the body at a position on the body that is opposite the slot, the distal end includes a first cut-out and a second cut-out which are in communication with the internal channel, the second cut-out being positioned perpendicular with respect to the first cut-out and opening out of the distal end wherein the second cut-out is sized and shaped to guide the handle of the fishing rod to the first cut-out as the fishing rod enters the distal end and into the internal channel and wherein the first cut-out is sized and shaped to accept the handle as the handle rotates from the second cut-out and into the first cut-out such that the first cut-out contacts the rod to prevent the rod from exiting the internal channel;

a tension member that operatively connects with the proximal end of the sleeve, the tension member includes an arm having a head portion and a tail portion, the head portion being positioned through the aperture, the internal channel and the slot to extend beyond the slot, the tail portion extending beyond the aperture and connecting with the surface when the rod holder is mounted to the surface;

an alarm connectable to the body of the sleeve, the alarm comprising:

a housing defining a front end, a rear end and a sidewall disposed between the front end and the rear end, the housing delimiting an enclosed chamber between the front end and the rear end and within the sidewall; and an electrical circuit mounted within the enclosed chamber, the electrical circuit including a control circuit, a power source, a switch, a trigger and a signal indicator operatively connected to one another wherein the power source supplies current to the control circuit, the switch electrically connects to the power source and to the control circuit, the switch cooperating with movement of the trigger when the trigger opens the switch upon engagement with the switch and when the trigger closes the switch upon disengagement from the switch, and wherein the control circuit sensing the closed switch activates the signal indicator to issue a signal.

4. The rod holder of claim of claim 3 wherein the trigger comprises a flexible member defining a first end, a second end and a trigger body disposed between the first end and the second end wherein the first end removably engages with the switch and the second end operatively connects with the control circuit.

5. The rod holder of claim 4 wherein the trigger body is externally positioned outside of the sidewall of the housing.

6. The rod holder of claim 5 wherein the trigger body includes a shoulder that contacts the fishing line in use wherein the fishing line moves the shoulder when the fish strikes the fishing line such that the movement of the shoulder disengages the first end from the switch to close the control circuit to activate the signal indicator.

7. The rod holder of claim 6 wherein the signal indicator comprises a transmitter that produces an audible alarm when the first end of the trigger closes the control circuit.

8. The rod holder of claim 6 the signal indicator comprises a light source that produces a visual alarm when the first end of the trigger closes the control circuit.

* * * * *